March 10, 1959
R. B. MATTHEWS
2,876,951
FLUID PRESSURE OPERATED CONTROL DEVICES
Filed Oct. 17, 1956
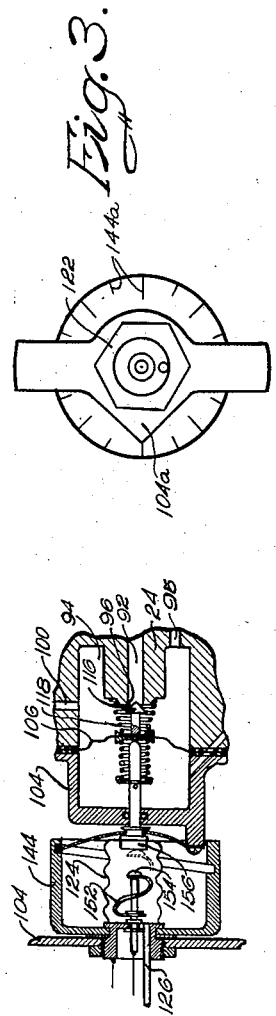
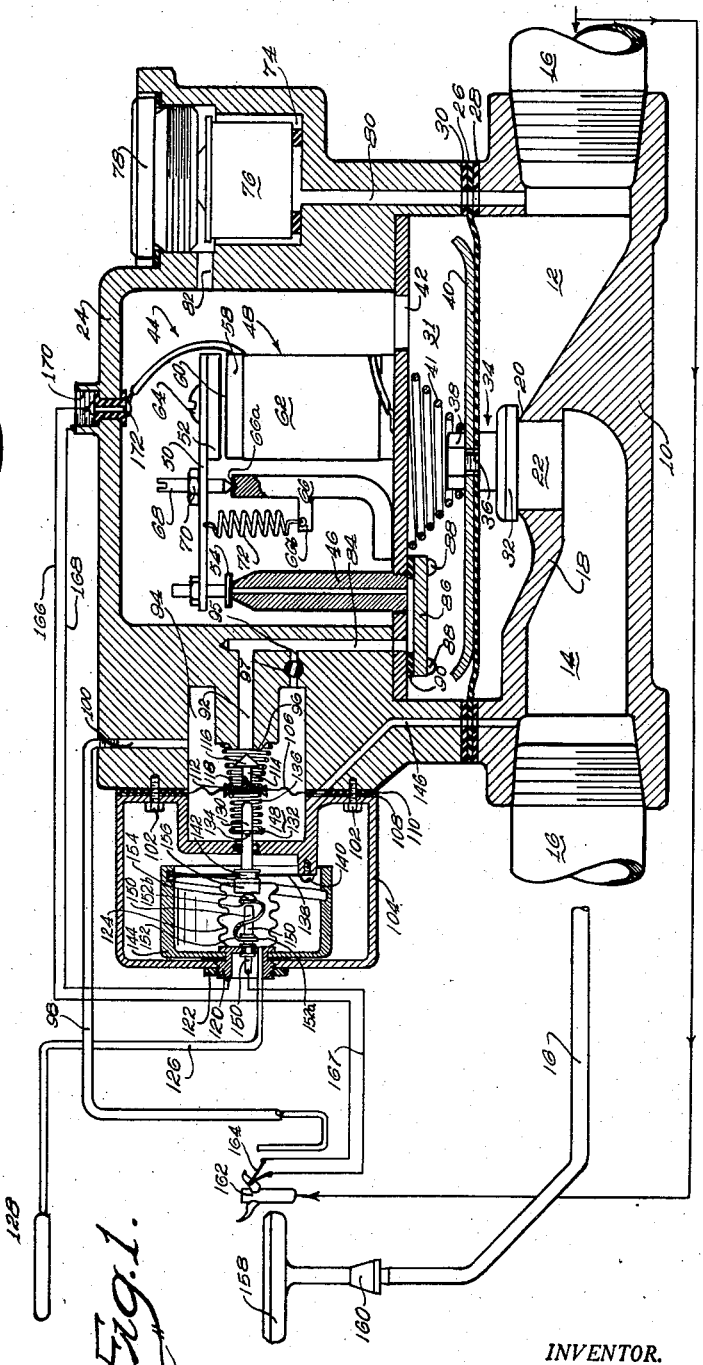
INVENTOR.
Russell B. Matthews
BY
Seegert & Schwalbach
Attys

United States Patent Office 2,876,951  
Patented Mar. 10, 1959

2,876,951

FLUID PRESSURE OPERATED CONTROL DEVICES

Russell B. Matthews, Wauwatosa, Wis., assignor to Baso Inc., Milwaukee, Wis., a corporation of Wisconsin Application October 17, 1956, Serial No. 616,506

10 Claims. (Cl. 236—84)

The present invention pertains to fluid pressure operated control devices and more particularly to fluid flow control valves which modulate the flow of fluid in accordance with variations in a given condition.

In supplying fluid fuel to certain fuel burning apparatus, it has been found desirable, if not necessary, to provide in addition to valve means for selectively turning off and on the fluid flow, pressure regulating means for maintaining the pressure of the fluid fuel supplied to the apparatus at a predetermined level. Such pressure regulation of fluid flow is necessary if it is desired to maintain substantially constant the amount of heat afforded by the main fuel burner of the apparatus despite substantial variations and fluctuations in the pressure of the fluid fuel as received from the source. Heretofore, it has been necessary to employ a separate device in the supply conduit to perform the pressure regulating function. This device, of course, was in addition to the usual on-off valve, and the cost entailed in providing separate housings and duplicate operating parts for each of the on-off valve and the regulator became significant to the point where in certain installations the regulator was purposely omitted for the sake of economy. Further, the cumbersome arrangement resulting from connecting several valve housings in series relation in the fuel supply conduit prevented installation in closely confined areas, again causing the regulator to be omitted.

It is therefore an object of the present invention to provide a single flow control device which affords both on-off control and pressure regulation control of fluid fuel flow to a main burner.

Another object of the present invention is to provide a fluid flow control device which affords modulation of fluid flow in response to both pressure variations and variations in an additional condition, there being means affording minimum safe fluid flow regardless of variations in said pressure and/or condition.

Another object of this invention is to provide a control device of the class described which takes the form of an electrically operated pressure responsive diaphragm valve having means rendering said device responsive to variations in the pressure of the fluid controlled and also responsive to variations in temperature, said device including means responsive to said temperature condition for interrupting energization of said valve device and effecting closure thereof upon occurrence of an extreme temperature condition.

Another object of the present invention is to provide in an electroresponsive pressure operated diaphragm valve device of the aforementioned character having a bleed control valve movable between full flow and reduced flow-permitting positions responsive to variations in a predetermined condition, means preventing reenergization of said device until said bleed control valve has returned to said full flow-permitting position to insure a large initial flow of fluid through said valve device upon reenergization thereof.

Another object is to provide a modulating pressure operated diaphragm valve device wherein modulation of the main fuel flow through the device is provided by means in the bleed passage controlling the amount of fluid bled from the pressure chamber of said device.

Another object is to provide in a pressure operated diaphragm valve device, an auxiliary valve in the bleed passage of said valve device and pressure responsive actuating means for the auxiliary valve responsive to the fluid pressure at the outlet of said device to control accordingly the rate of bleeding of fluid through said passage whereby the pressure at said outlet is maintained substantially constant.

Another object is to provide fluid flow control apparatus of the class described powered by current from a thermoelectric generator subject to the heat of a pilot burner adjacent the main burner supplied with fuel through said device, said modulating and pressure regulating operation of the device being possible only when said electroresponsive diaphragm valve device is energized by said thermoelectric generator, said device affording safety shut-off of the fuel on deenergization thereof following pilot burner outage.

Another object is to provide a fluid flow control apparatus as above set forth wherein means responsive to the heat afforded by said main burner is provided for interrupting energization of said device to shut off fuel flow to the main burner upon occurrence of an extreme temperature condition.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Figure 1 is a sectional view of an embodiment of the present invention shown, more or less schematically, connected to various elements of a fluid fuel burning apparatus;

Figure 2 is a fragmentary sectional view of the device of Figure 1 showing the condition responsive electrical contacts in open circuit position and the auxiliary valve member in closed position; and Figure 3 is an elevational view of the adjustable control point setting mechanism of the condition responsive means.

Like reference characters indicate corresponding parts throughout the several views of the drawings.

Referring to Figure 1 of the drawings, it shows a valve or control body 10 formed with an inlet chamber 12 and an outlet chamber 14 connected to contiguous sections of a main burner fuel supply conduit 16. A partition wall 18 is formed in body 10 for separation of inlet chamber 12 and outlet chamber 14 and comprises a valve seat 20 affording a control port 22.

A valve operator housing 24 is fixed to control body 10 over an opening in the upper wall thereof, there being a movable partition or flexible diaphragm 26 fixed therebetween about its marginal edge. Sealing means such as gaskets 28 and 30 are installed on opposite sides of the marginal edge of diaphragm 26 to prevent escape of fluid fuel. Such positioning of diaphragm 26 provides a pressure chamber 31 on the side thereof within housing 24 while the other side thereof is exposed to the fluid pressure in inlet chamber 12.

A flow control member or valve disc 32 preferably having a facing formed of resilient material such as rubber, is provided for flow control cooperation with valve seat 20. Valve disc 32 is fixed to mounting means 34 comprising an externally threaded stud 36 extending through suitable apertures in the diaphragm 26 and a back-up plate or reenforcing member 40 overlying said diaphragm. The diaphragm 26 and plate 40 are clamped between the valve member 32 and a nut 38 threaded on the stud 36 as shown. Back-up plate 40 functions as a stiffening member for the diaphragm and also serves to define the effective area of diaphragm 26 as is well known in the art. A mounting member 42 is fixed within operator housing 24 but does not seal off the portions of chamber 31 on opposite sides thereof. A helical compression spring 41 is provided between back-up plate 40 and mounting member 42 to bias valve disc 32 toward flow-preventing position relative to valve seat 20.

Positioned within operator housing 24 on mounting member 42 is pilot valve means 44 comprising a tubular bleed port member 46 threaded within a suitable opening in the member 42, an electromagnet 48, and an operating lever 50 carrying an armature 52 and a pilot valve or bleed port valve member 54 cooperable with bleed port member 46. Electromagnet 48 comprises a core member 58, which may be U-shaped and formed with a pair of pole faces 60, and an electromagnet winding 62. Core member 58 is fixed to the mounting member 42 in any well known manner, and the armature 52 is fixed to operating lever 50, by means such as screw 64, in a position to cooperate with the pole faces 60 of the electromagnet 48.

Operating lever 50 may be pivotally mounted on a bracket 66 by means of a pair of pivot screws 68 threadably inserted within an opening formed in lever 50, there being a lock nut 70 for cooperation with each screw 68 to retain said screw in any desired position relative to lever 50. One end of each pivot screw 68 is formed with a screw driver kerf to facilitate adjustment of said screw, while the other end thereof is formed with a taper to provide a pivot point for cooperation with a dished or grooved end portion or fulcrum 66a formed in bracket 66.

A helical tension spring 72 is connected at its opposite ends to an extension 66b of bracket 66 and to the operating lever 50 for biasing the latter in a counterclockwise direction about fulcrum 66a as viewed in the drawings, to thereby bias the valve member 54 toward flow-preventing position with respect to the bleed port member 46. Valve member 54 is adjustably fixed to the operating lever 50, it being carried by an adjusting screw threadably mounted in lever 50 and held in a selected fixed relation with respect thereto by a lock nut.

Operator housing 24 is also formed with a filter chamber 74 wherein a filter 76 is held in operative position by a nut 78. A fluid passage 80 is provided between inlet chamber 12 and filter chamber 74 through openings formed in valve body 10, gaskets 28 and 30, diaphragm 26 and operator housing 24. A passageway 82 is provided within operator housing 24 to afford communication between filter chamber 74 and pressure chamber 31. A bleed passage 84 is formed in housing 24 and is afforded communication with the through opening of bleed port member 46 by means of a plate or conduit member 86 sealingly fixed in spaced relation to mounting member 42 by means such as screws 88 and gasket 90. Operator housing 24 is also formed with passageways 92 and 95 in communication with passage 84. Fluid communication between the inlet chamber 12 and the pressure chamber 31 is preferably of a restricted nature, and to this end, substantial restriction of the fluid flow through the passages 80 and 82 and chamber 74 may be provided by the filter 76 or by making the passages 80 and/or 82 of a size to provide the desired restriction.

Housing 24 is further formed with a valve chamber 94 with which passageways 92 and 95 communicate, there being an auxiliary valve seat 96 surrounding the passageway 92 within the chamber 94, and there being a manually operated flow control valve 97 disposed within the passageway 95. A bleed conduit 98 having one end threadably fixed to operator housing 24 is afforded communication with valve chamber 94 through a passageway 100 formed in operator housing 24.

Fixed as by screws 102, to the side of operator housing 24 and covering the chamber 94 is a bleed control mechanism comprising a bracket member 104, a movable partition or flexible diaphragm 106 being fixed therebetween along its marginal edge. Sealing means such as gaskets 108 and 110 are installed on opposite sides of the marginal edge of diaphragm 106 to prevent escape of fluid fuel. Fixed to diaphragm 106 by any suitable fastening means such as that shown at 112, is a valve mechanism comprising a valve stem 114 fixed to fastening means 112 and carrying an auxiliary valve member 116. A helical compression spring 118 is interposed between operator housing 24 and fastening means 112 to urge auxiliary valve member 116 toward its extreme flow-permitting position with respect to valve seat 96.

Fixed to bracket member 104 is a condition responsive mechanism comprising mounting means 120 secured to bracket 104 by means of a nut 122 and carrying an expansible and contractible enclosure or bellows 124. A capillary tube 126 is afforded communication with the interior of the bellows 124 through mounting member 120 and has an enlarged end portion 128 constituting a condition responsive bulb. I prefer to provide bellows 124, tube 126 and bulb 128 with an expansible and contractible volatile fluid fill. Bellows 124 has a movable end wall to which is fixed an operating stem 130 which extends through an opening formed in bracket 104 as shown, there being an O-ring seal between stem 130 and bracket 104 to prevent escape of fluid fuel. Interposed between mounting means 112 and a spring retaining member 132 which rests against a mounting pin 134 positioned within an opening in operator stem 130, is a compression spring 136.

A leaf spring 138 fixed at one end to a portion of bracket 104, as by means of screw 140, has its intermediate portion fixed to operating stem 130 as by means of a collar member 142. The other end of leaf spring 138 rests against a helical cam surface formed on the inner surface of a control point adjustment member 144 which is rotatably carried by the mounting member 120. Member 144 affords means for adjusting the biasing force of leaf spring 138 on the movable end wall of bellows 124 and carries certain indicia 144a (Figure 3) for cooperation with a pointer 104a formed on bracket 104 to facilitate setting the control point of the device at a selected value. A passageway 146 formed by aligned openings in valve body 10, diaphragm 26, gaskets 28 and 30, housing 24, diaphragm 106, gaskets 108 and 110 and bracket 104 affords communication between outlet chamber 14 and the auxiliary pressure chamber 148 formed by bracket 104 and diaphragm 106.

Insulatedly and sealingly extending through an opening formed in a stationary end wall of bellows 124, is a terminal member 150 formed of material of good electrical conductivity. One end 152a of an S-shaped contact carrier 152 is fastened to terminal member 150 in electrical continuity therewith. The other end 152b of contact carrier 152 is provided with a magnetically permeable low resistance electrical contact 154. Contact carrier 152 is formed of material which is a good conductor of electricity and which is resilient and flexible, so that following deformation said member tends to return to its initial position as shown in solid lines in Figure 2 as will hereinafter be explained. Fixed to the movable end wall of bellows 124 is a low resistance contact member 156 having permanent magnet characteristics, said member being cooperable with contact 154.

As shown in the drawings, conduit 16 affords fuel supply to a main burner 158 through a mixing chamber 160. A pilot burner or ignition burner 162, juxtaposed with respect to the main burner for ignition thereof, is supplied with fluid fuel by means separate from or independent of the subject fluid pressure operated control device as schematically shown in the drawings. Positioned adjacent pilot burner 162 for heating thereby, is a thermoelectric generator or thermocouple 164 connected in circuit with contacts 154 and 156.

The circuit of thermoelectric generator 164 also includes lead wires 166 and 168 which may be arranged in coaxial fashion and provided with a lead connector for threaded engagement with connecting means 170 formed in operator housing 24. Such connector affords grounding of lead wire 168 to housing 24 and affords connection of lead wire 166 to a terminal member 172 which is insulatedly mounted in housing 24. One end of the electromagnet winding 62 is connected to terminal 172 while the other end thereof is grounded to housing 24 as by connection thereof to mounting member 42. Contact 154 is connected to one side of thermocouple 164 through contact carrier 152, terminal member 150 and a lead conductor 167, while contact 156 is connected in circuit with lead wire 168 through the movable end wall of bellows 124, the flexible side walls thereof and mounting member 120, thus completing the energizing circuit for winding 62 through lead wire 166, terminal 172, winding 62, operator housing 24, lead wire 168, contacts 154 and 156 and lead wire 167.

The operation of the embodiment shown in the drawing will now be described.

With electromagnet winding 62 unenergized as by disengagement of contacts 154 and 156 and/or by virtue of extinguishment of pilot burner 162 and hence cooling of thermocouple 164, operating lever 50 is urged in a counterclockwise direction by tension spring 72, thereby positioning valve member 54 in its flow-preventing position relative to bleed port member 46. With valve member 54 so positioned, fluid fuel flows from inlet chamber 12 through passageway 80, filter 76 and passageway 82 into pressure chamber 31 where it exerts on the upper surface of diaphragm 26 as viewed in the drawing, a pressure which is equal and opposite to the fluid pressure exerted on the underside thereof by the fluid within inlet chamber 12. The fluid fuel within pressure chamber 31 builds up to this condition because valve member 54 prevents bleeding of fluid fuel. Under these conditions, compression spring 41 is effective to position valve disc 32 in its flow-preventing position relative to valve seat 20.

It will be noted that with valve members 54 and 32 in their flow-preventing positions, each of the opposite sides of auxiliary diaphragm 106 is exposed to atmospheric pressure, thereby permitting compression spring 118 to position auxiliary valve member 116 in its extreme flow-permitting position.

In order to afford fluid fuel flow to main burner 158, it is first necessary to ignite the fuel emitted at pilot burner 162 for heating of the hot junction of thermocouple 164 to afford an electrical potential across the cold junctions thereof. Under these conditions engagement of contacts 154 and 156 by contraction of bellows 124 in response to a predetermined condition at bulb 128 completes the hereinbefore described energizing circuit for winding 62 of electromagnet 48. Energization of winding 62 causes magnetic flux to flow in core member 58 and to link armature 52, whereupon operating lever 50 is pivoted in a clockwise direction about fulcrum 66a against the force of tension spring 72, due to the magnetic attraction of armature 52 to pole faces 60 afforded by said flux. Such movement of operating lever 50 moves valve member 54 to its flow-permitting position with respect to bleed port member 46, thereby permitting the fluid fuel within pressure chamber 31 to flow through bleed port member 46, passageways 84, 92 and 100, and through bleed conduit 98 to the surrounding atmosphere adjacent the pilot burner 162 where it is burned. Such flow of fluid from within pressure chamber 31 effects bleeding of the fluid pressure on the upper surface of diaphragm 26, whereupon the pressure on the under side thereof overcomes the biasing force of compression spring 41 and moves said diaphragm upwardly and hence valve disc 32 to flow-permitting position relative to valve seat 20. In this manner, fluid fuel is permitted to flow from inlet chamber 12 through flow control port 22, outlet chamber 14 and conduit 16 to main burner 158 where it is ignited by the flame at pilot burner 162.

Flow of fluid to main burner 158 increases the fluid pressure within outlet chamber 14 and hence the pressure within auxiliary pressure chamber 148. Such increase in pressure causes a force to be exerted on auxiliary diaphragm 106 for overcoming the biasing force of spring 118 and moving auxiliary valve 116 toward its flow-preventing position. Such movement of auxiliary valve member 116 toward its valve seat 96 restricts or meters the fluid fuel flow from pressure chamber 31 to the atmosphere, thereby increasing the fluid pressure on the upper surface of diaphragm 26 and effecting movement of valve disc 32 toward its flow-preventing position. Thus fluid fuel flow from inlet chamber 12 to outlet chamber 14 is restricted, decreasing the fluid pressure within the latter chamber. Such decrease in fluid pressure within chamber 14 affords a decrease in fluid pressure within pressure chamber 148, whereupon spring 118 effects movement of auxiliary valve 116 in a direction away from its flow-preventing position. This movement of auxiliary valve 116 permits increased bleeding of fluid pressure from within pressure chamber 31 for movement of valve disc 32 away from its flow-preventing position. Such movement of valve disc 32, of course, effects an increase in the flow of fluid fuel between inlet chamber 12 and outlet chamber 14. This sequential operation continues until a constant fluid pressure is established within outlet 14, the variations in fluid pressure within outlet chamber 14 and hence the variations in the position of valves 116 and 32 becoming successively smaller.

Auxiliary valve 116 will come to rest whenever the fluid pressure on diaphragm 106 is balanced by the biasing effect of spring 118 thereon. It will thus be readily apparent to those persons skilled in the art, that spring 118 must not exert a constant spring force, but rather must exert a force which is variable within a predetermined range.

The above explained operation provides fluid fuel flow at a predetermined pressure to main burner 158 whenever electromagnet 48 is initially energized. However, since sources of fluid fuel supply are generally incapable of supplying fluid fuel at a constant pressure, it is desirable to provide means for compensating for any changes in the pressure of the fluid fuel supplied from the source so as to maintain the aforementioned predetermined fuel pressure and thereby a substantially constant flame at the main burner. It will be noted that the aforedescribed bleed control means will compensate for such variations in supply line pressure, since any variation in fluid pressure within inlet chamber 12 causes a corresponding change in fluid pressure within outlet chamber 14 whenever valve disc 32 is in flow-permitting position. Such variation in pressure within the outlet chamber 14 causes variation in the position of auxiliary valve 116 and hence variation in the position of valve disc 32 in the same manner as above explained with regard to regulation of fluid pressure during initial energization of electromagnetic operator 48. That is to say, when the pressure of the fluid fuel from the source increases, thereby increasing the pressure within chambers 12 and 14 auxiliary valve 116 decreases the amount of fluid pressure bled from within pressure chamber 31 causing valve disc 32 to be moved toward its flow-preventing position to decrease the flow of fluid between chambers 12 and 14, whereupon the pressure drop between said chambers is increased to maintain the pressure within outlet chamber 14 at a predetermined level.

Conversely, any decrease in pressure of the fluid fuel from the source of supply causes pressure drops in chambers 12 and 14 whereupon auxiliary valve 116 permits increased bleeding of fluid pressure from within chamber 31 to effect movement of valve disc 32 to a position of increased flow of fluid fuel between chambers 12 and 14, thereby decreasing the pressure drop between chambers 12 and 14 so as to maintain the fluid pressure within chamber 14 at said predetermined level.

Since the volatile fluid fill of bellows 124, tube 126, and bulb 128 is expansible and contractible with variations in temperature, I prefer to position bulb 128 in the space to be heated by the flame of main burner 158. As the temperature of the space being heated by main burner 158 increases, the volatile fill within bellows 124, tube 126 and bulb 128 expands, thereby moving the movable end wall of bellows 124 against the biasing force of leaf spring 138. This, of course, creates a force which is transmitted through operating stem 130, pin 134, spring retainer 132, spring 136, mounting means 112 and valve stem 114 for movement of auxiliary valve 116 toward its flow-preventing position. In this manner, auxiliary valve 116 effects reduction in the amount of fluid fuel supplied to and hence the heat afforded by main burner 158. It is thus noted that following energization of winding 62 the position of valve disc 32 and hence the flame at main burner 158 is controlled simultaneously by variations in pressure within outlet chamber 14 and variations in temperature sensed by bulb 128.

Because of the aforedescribed modulating control of auxiliary valve 116 in response to variations in a given condition such as temperature, it is seen that in the absence of means to prevent it, the auxiliary valve 116 could assume a position wherein it causes main valve disc 32 to be so disposed that it does not permit a sufficient amount of fuel to flow to main burner 158 for safe burning thereat. In order to prevent such an occurrence, passageway 95 affords a by-pass around valve 116 for at least a portion of the fluid being bled from pressure chamber 31. In this manner, even though auxiliary valve 116 is moved to its flow-preventing position, valve 32 is sufficiently open to provide a minimum safe flame at main burner 158. The size of such minimum flame can be varied by merely adjusting the position of valve 97 within passageway 95 as is well known in the art.

As the fluid fill of bellows 124 expands and effects movement of the movable end wall of bellows 124, permanent magnet contact 156 moves to the right as viewed in Figures 1 and 2. However, due to the magnetic attraction between the permeable contact 154 and the permanent magnet contact 156, the energizing circuit of electromagnet winding 62 is not interrupted, but rather contact carrier 152 is elongated against the biasing force inherent in the resilient or flexible material of which it is formed. In this manner, as the temperature exposed to bellows 124 increases, causing auxiliary valve 116 to be moved toward its flow-preventing position, contacts 154 and 156 are moved in accordance with movement of the movable end wall of bellows 124 but remain engaged due to the magnetic attraction. However, since the inherent biasing force of contact carrier 152 increases with increased deformation thereof, a point is reached when such biasing force overcomes the magnetic attraction between contacts 154 and 156. At this point contacts 154 and 156 separate and end 152b of carrier 152 returns to abutting engagement with the end of terminal member 150 (see Figure 2). Such movement of contact carrier 152 interrupts fluid fuel flow to main burner 158 by virtue of deenergization of winding 62 of electromagnet 48 and closure of pilot valve member 54. More specifically, deenergization of winding 62 permits tension spring 72 to pivot operating lever 50 in a counterclockwise direction about fulcrum 66a for return of valve member 54 to its flow-preventing position in engagement with bleed port member 46. Such movement of valve member 54 permits the fluid pressure within pressure chamber 31 to increase to a point where compression spring 41 returns valve disc 32 to its flow-preventing position in engagement with valve seat 20. In this manner fuel flow to main burner 158 is interrupted upon disengagement of contacts 154 and 156.

Return of contact carrier 152 and with it contact 154 to their original positions, makes it necessary for bellows 124 to contract sufficiently to permit compression spring 118 to move auxiliary valve 116 to a maximum flow-permitting position before the contacts 154 and 156 reengage to permit electromagnet winding 62 to be reenergized. This, of course, insures that where such reenergization occurs, the valve 32 will be moved to its full open position and maximum fuel will flow to main burner 158 for safe ignition thereof by pilot burner 162.

If pilot burner 162 remains ignited so as to adequately heat the hot junction of thermocouple 164, valve disc 32 is controlled between its flow-preventing and flow-permitting positions in accordance with operation of contacts 154 and 156. In addition, however, valve disc 32 is modulated and the amount of fluid fuel supplied to main burner 158 is varied in accordance with variations in pressure at outlet 14 as well as in accordance with variations in temperature sensed by bulb 128.

In Figure 2, the bellows 124 is shown expanded to the point where contacts 154 and 156 have separated, the position of contact 154 just prior to separation being shown in broken lines. It will be observed that such expansion of bellows 124 also effects seating of the auxiliary valve 116 on seat 96. As aforementioned, the control point, i. e., the temperature setting at which the contacts 154 and 156 are desired to separate for shut off of the fuel can be adjusted to any selected setting by rotation of the member 144.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A pressure operated control device comprising, a main valve, pressure responsive means for actuating said main valve between two extreme flow controlling positions, electro-responsive pilot valve means energizable to permit and deenergizable to prevent movement of said main valve by said actuating means from one of its said extreme positions toward the other, a thermoelectric generator for energization of said pilot valve means, an auxiliary valve operatively associated with said pilot valve means for control of the flow of fluid through said pilot valve means when the latter is energized by said generator, and operating means for said auxiliary valve comprising an expansible and contractible hermetically sealed enclosure operatively associated with said auxiliary valve and having a fill responsive to variations in a given condition to move said auxiliary valve and vary the flow of fluid through said pilot valve means to thereby cause said actuating means to move said main valve to corresponding adjusted flow controlling positions for modulation of the flow of fuel through said control device, said auxiliary valve operating means also including cooperating electrical contacts within said enclosure and connected in circuit with said thermoelectric generator and pilot valve means, said contacts being operatively associated with said enclosure whereby response of the latter to an extreme in said condition causes said contacts to interrupt energization of said pilot valve means and causes said actuating means to position said main valve in said one of its extreme flow controlling positions.

2. A pressure operated control device comprising, a main valve, pressure responsive means for actuating said main valve between two extreme flow controlling positions, electro-responsive pilot valve means energizable to permit and deenergizable to prevent movement of said main valve by said actuating means from one of its said extreme positions toward the other, energizing means for said pilot valve means, an auxiliary valve operatively associated with said pilot valve means for control of the flow of fluid through said pilot valve means when the latter is energized, and operating means for said auxiliary valve responsive to variations in a given condition to move said auxiliary valve and vary the flow of fluid through said pilot valve means to thereby cause said actuating means to move said main valve to corresponding adjusted flow controlling positions for modulation of the flow of fuel through said control device, said auxiliary valve operating means also including circuit controlling means in circuit with said energizing and pilot valve means and responsive to an extreme in said condition to interrupt energization of said pilot valve means and cause said actuating means to position said main valve in said one of its extreme flow controlling positions, said auxiliary valve operating means further including means for preventing reenergization of said pilot valve means until said condition has moderated to a predetermined level effecting disposition of said auxiliary valve in an adjusted position causing, upon reenergization of said pilot valve means, said main valve to move toward its other extreme position to permit a rate of flow therepast different from that permitted by said main valve at the time of said interruption.

3. A pressure operated control device comprising, a main valve, pressure responsive means for actuating said main valve between two extreme flow controlling positions, electro-responsive pilot valve means energizable to permit and deenergizable to prevent movement of said main valve by said actuating means from one of its said extreme positions toward the other, energizing means for said pilot valve means, an auxiliary valve operatively associated with said pilot valve means for control of the flow of fluid through said pilot valve means when the latter is energized, and operating means for said auxiliary valve comprising an hermetically sealed enclosure operatively associated with said auxiliary valve and having a fluid fill which is expansible and contractible in response to temperature variations to move said auxiliary valve and vary the flow of fluid through said pilot valve means to thereby cause said actuating means to move said main valve to corresponding adjusted flow controlling positions for modulation of the flow of fuel through said control device in accordance with temperature variations, said auxiliary valve operating means also including low resistance cooperating contacts within said enclosure and connected in circuit with said energizing means and said pilot valve means and responsive to an extreme temperature to interrupt energization of said pilot valve means and cause said actuating means to position said main valve in said one of its extreme flow controlling positions, said auxiliary valve operating means further including means for preventing reenergization of said pilot valve means until said temperature has moderated to a predetermined level.

4. A pressure operated control device comprising, a main valve, pressure responsive means for actuating said main valve between flow-preventing position and an extreme flow-permitting position, electroresponsive pilot valve means energizable to permit and deenergizable to prevent movement of said main valve by said actuating means from its flow-preventing toward its extreme flow-permitting position, energizing means for said pilot valve means, an auxiliary valve operatively associated with said pilot valve means for control of the flow of fluid through said pilot valve means when the latter is energized, and operating means for said auxiliary valve responsive to variations in a given condition to move said auxiliary valve between flow-preventing and an extreme flow-permitting position and vary accordingly the flow of fluid through said pilot valve means to thereby cause said actuating means to move said main valve to corresponding adjusted flow controlling positions for modulation of the flow of fuel through said control device, and means affording a fluid flow by-pass for said auxiliary valve to prevent said modulation below a predetermined minimum fuel flow through said device, said auxiliary valve operating means also including circuit controlling means in circuit with said energizing and pilot valve means and responsive to an extreme in said condition to interrupt energization of said pilot valve means and cause said actuating means to position said main valve in its flow-preventing position.

5. A pressure operated control device comprising, a main valve, pressure responsive means for actuating said main valve between flow-preventing position and an extreme flow-permitting position, electroresponsive pilot valve means energizable to permit and deenergizable to prevent movement of said main valve by said actuating means from its flow-preventing position toward its extreme flow-permitting position, energizing means for said pilot valve means, an auxiliary valve operatively associated with said pilot valve means for control of the flow of fluid through said pilot valve means when the latter is energized, and operating means for said auxiliary valve responsive to variations in a given condition to move said auxiliary valve between flow-preventing and an extreme flow-permitting position and vary accordingly the flow of fluid through said pilot valve means to thereby cause said actuating means to move said main valve to corresponding adjusted flow controlling positions for modulation of the flow of fuel through said control device, and means affording a fluid flow by-pass for said auxiliary valve to prevent said modulation below a predetermined minimum fuel flow through said device, said auxiliary valve operating means also including circuit controlling means in circuit with said energizing and pilot valve means and responsive to an extreme in said condition to interrupt energization of said pilot valve means and cause said actuating means to position said main valve in its flow-preventing position, said auxiliary valve operating means further including means for preventing reenergization of said pilot valve means until said condition has caused said operating means to position said auxiliary valve so as to afford a predetermined greater fuel flow through said device than said predetermined minimum.

6. In a control device, in combination, a main valve, pressure responsive means for actuating said main valve between flow-preventing and safe ignition positions, electroresponsive pilot valve means energizable to permit and deenergizable to prevent movement of said main valve by said actuating means from its flow-preventing position, an auxiliary valve operatively associated with said pilot valve means for control of the flow of fluid through said pilot valve means when the latter is energized, operating means for said auxiliary valve to move said auxiliary valve between flow controlling positions of fluid flow through said pilot valve means in accordance with variations in a given condition to cause said actuating means to move said main valve to corresponding adjusted flow controlling positions for modulation of the flow of fluid through said control device, said operating means comprising a pair of cooperating contacts in circuit with said pilot valve means and under the control of said operating means effective to afford energization of said pilot valve means when placed in engagement by said operating means and movable as a unit with movement of said auxiliary valve between its extreme flow-permitting position and a position thereof which effects disposition of said main valve in a minimum safe flow position of fluid flow through said device, said contacts being disengaged to afford deenergization of said pilot valve means and movement of said main valve to flow-preventing position with movement of said auxiliary valve to a position effecting disposition of said main valve in a position affording less flow through said control device than said minimum safe flow.

7. In a control device, in combination, a main valve, pressure responsive means for actuating said main valve between flow-preventing and safe ignition positions, electroresponsive pilot valve means energizable to permit and deenergizable to prevent movement of said main valve by said actuating means from its flow-preventing position, a thermoelectric generator for energization of said pilot valve means, an auxiliary valve operatively associated with said pilot valve means for control of the flow of fluid through said pilot valve means when the latter is energized by said generator, operating means for said auxiliary valve to move said auxiliary valve between flow controlling positions of fluid flow through said pilot valve means in accordance with variations in a given condition to cause said actuating means to move said main valve to corresponding adjusted flow controlling positions for modulation of the flow of fluid through said control device, said operating means comprising a pair of cooperating low resistance contacts in circuit with said thermoelectric generator and said pilot valve means and under the control of said operating means effective to afford energization of said pilot valve means by said thermoelectric generator when placed in engagement by said operating means and movable as a unit with movement of said auxiliary valve between its extreme flow-permitting position and a position thereof which effects disposition of said main valve in a minimum safe flow position of fluid flow through said device, said contacts being disengaged to afford deenergization of said pilot valve means and movement of said main valve to flow-preventing position with movement of said auxiliary valve to a position effecting disposition of said main valve in a position affording less flow through said control device than said minimum safe flow.

8. In a control device, in combination, a main valve, pressure responsive means for actuating said main valve between flow-preventing and safe ignition positions, electroresponsive pilot valve means energizable to permit and deenergizable to prevent movement of said main valve by said actuating means from its flow-preventing position, an auxiliary valve operatively associated with said pilot valve means for control of the flow of fluid through said pilot valve means when the latter is energized, operating means for said auxiliary valve comprising an hermetically sealed enclosure having a condition responsive expansible and contractible fluid fill and a movable portion connected to said auxiliary valve and movable with expansion and contraction of said fill to move said auxiliary valve between flow controlling positions of fluid flow through said pilot valve means in accordance with variations in a given condition to cause said actuating means to move said main valve to corresponding adjusted flow controlling positions for modulation of the flow of fluid through said control device, said operating means comprising a pair of cooperating movable low resistance contacts in circuit with said pilot valve means and under the control of said operating means, one of said contacts being connected to and movable with said movable portion into engagement with the other of said contacts to afford energization of said pilot valve means when said movable portion effects disposition of said auxiliary valve in position to effect disposition of said main valve in its safe ignition position, said contacts being movable as a unit with movement of said auxiliary valve between its extreme flow-permitting position and a position thereof which effects disposition of said main valve in a minimum safe flow position of fluid flow through said device, said contacts being disengaged to afford deenergization of said pilot valve means and movement of said main valve to flow-preventing position with movement of said auxiliary valve to a position effecting disposition of said main valve in a position affording less flow through said control device than said minimum safe flow.

9. In a control device, in combination, a main valve, pressure responsive means for actuating said main valve between flow-preventing and safe ignition positions, electroresponsive pilot valve means energizable to permit and deenergizable to prevent movement of said main valve by said actuating means from its flow-preventing position, an auxiliary valve operatively associated with said pilot valve means for control of the flow of fluid through said pilot valve means when the latter is energized, operating means for said auxiliary valve comprising an hermetically sealed enclosure having a condition responsive expansible and contractible fluid fill and a movable portion connected to said auxiliary valve and movable with expansion and contraction of said fill to move said auxiliary valve between flow controlling positions of fluid flow through said pilot valve means in accordance with variations in a given condition to cause said actuating means to move said main valve to corresponding adjusted flow controlling positions for modulation of the flow of fluid through said control device, a first contact connected to and movable with said movable portion, a second contact biased toward a normal retracted position and movable to a predetermined extended position, said movable portion and first contact being movable by contraction of said fill to a position where said first contact engages said second contact when the latter is in its normal retracted position with accompanying movement of said auxiliary valve to a position effecting disposition of said main valve in its ignition position; means magnetically latching said engaged contacts together to move said second contact with said first contact and movable portion against the bias of said second contact during expansion of said fill, said latching means being independent of the current flow through said contacts and any expansion of said fill which moves said second contact with said first contact beyond said predetermined extended position causing disengagement of said contacts at a point where said auxiliary valve has also been moved in a flow reducing direction to effect disposition of said main valve in a predetermined minimum flow-permitting position of fluid flow through said device, said second contact upon disengagement returning to the normal retracted position toward which it is biased, thereby preventing reengagement of said contacts until said fill has contracted sufficiently to permit said auxiliary valve to be moved to its position effecting disposition of said main valve in its ignition position.

10. A modulating diaphragm valve comprising a main valve, pressure responsive means for actuating said main valve between closed and full open positions, electroresponsive pilot valve means for said actuating means energizable to cause said actuating means to open said main valve and deenergizable to cause said actuating means to close said main valve, an auxiliary valve for controlling the flow of fluid through said pilot valve means when the latter is energized and thereby controlling the position of said main valve, condition responsive actuating means for modulating said auxiliary valve between open and closed positions and thereby causing said pressure responsive actuating means to correspondingly modulate said main valve in accordance with variations in a given condition, means affording a bypass around said auxiliary valve preventing modulation of said main valve below a predetermined minimum open position, circuit controlling means also under the control of said auxiliary valve actuating means and in circuit with said pilot valve means, said circuit controlling means having a circuit making condition and being actuated by said auxiliary valve actuating means to a circuit interrupting position in response to an extreme in said condition to thereby interrupt energization of said pilot valve means and effect closure of said main valve, said circuit controlling means having means retaining the latter in circuit interrupting condition until moderation of said condition has caused said auxiliary valve actuating means to reopen said auxiliary valve to a position corresponding to disposition of said main valve in a position of greater opening than said minimum.

References Cited in the file of this patent

UNITED STATES PATENTS

| | | |
|---|---|---|
| 2,214,558 | Kronmiller | Sept. 10, 1940 |
| 2,216,809 | Derby | Oct. 8, 1940 |
| 2,245,773 | Grant | June 17, 1941 |
| 2,317,640 | Ray | Apr. 27, 1943 |
| 2,461,615 | Taylor | Feb. 15, 1949 |
| 2,717,123 | Hilgert et al. | Sept. 6, 1955 |
| 2,724,030 | Hilgert | Nov. 15, 1955 |